United States Patent [19]

Lin

[11] Patent Number: 5,044,268
[45] Date of Patent: Sep. 3, 1991

[54] CUTTING DEVICE

[76] Inventor: Thomas Lin, 606-608 Imperial St., Los Angeles, Calif. 90021

[21] Appl. No.: 245,749

[22] Filed: Sep. 16, 1988

[51] Int. Cl.[5] .......................... A23N 4/00; A23N 7/00
[52] U.S. Cl. ........................................ 99/541; 83/620; 99/537; 99/590; 99/591; 99/642
[58] Field of Search .................... 99/540-545, 99/590, 591, 592, 588, 589, 537, 538, 642; 17/21, 50; 83/618, 620, 567, 566, 697, 621

[56] References Cited

U.S. PATENT DOCUMENTS

| 471,158 | 3/1892 | Westerman | 99/545 |
|---|---|---|---|
| 1,365,396 | 1/1921 | Gormley et al. | 99/588 |
| 1,943,113 | 1/1934 | Daum | 83/620 |
| 1,979,626 | 11/1934 | Koidl | 83/618 |
| 2,092,550 | 9/1937 | Davis | 99/590 |
| 2,210,974 | 8/1940 | DePrume | 99/543 |
| 2,293,721 | 8/1942 | Engler | 83/566 |
| 4,252,056 | 2/1981 | Altman | 99/544 |
| 4,318,339 | 3/1982 | Sage | 99/589 |
| 4,352,325 | 10/1982 | Pleus | 99/545 |
| 4,834,795 | 5/1989 | Raub et al. | 99/542 |

FOREIGN PATENT DOCUMENTS 0275810  7/1988  European Pat. Off. ............. 99/588

Primary Examiner—Timothy F. Simone
Attorney, Agent, or Firm—Ladas & Parry

[57] ABSTRACT

The invention provides for a cutting device having a mounting member comprised of two cylindrical portions mounted on a base. The two cylindrical portions are arranged co-axially, and define between them a recess adapted to accommodate an article to be cut. Cutting blades are provided and comprise a first cutting blade of tubular shape mounted on a cylindrical portion of the mounting block and a flat blade mounted in a slot in one of the mounting blocks. A moving mechanism is provided to move the blades across the recess when an article is located therein, thereby removing and discarding the outer portions of the article. The invention further comprises a feed system for feeding the article into the recess of the cutting device. The feed system comprises a segmenting apparatus, a transport line between the segmenting apparatus and the recess of the cutting device, as well as propulsion means for moving the article from the transport line into the recess.

27 Claims, 10 Drawing Sheets

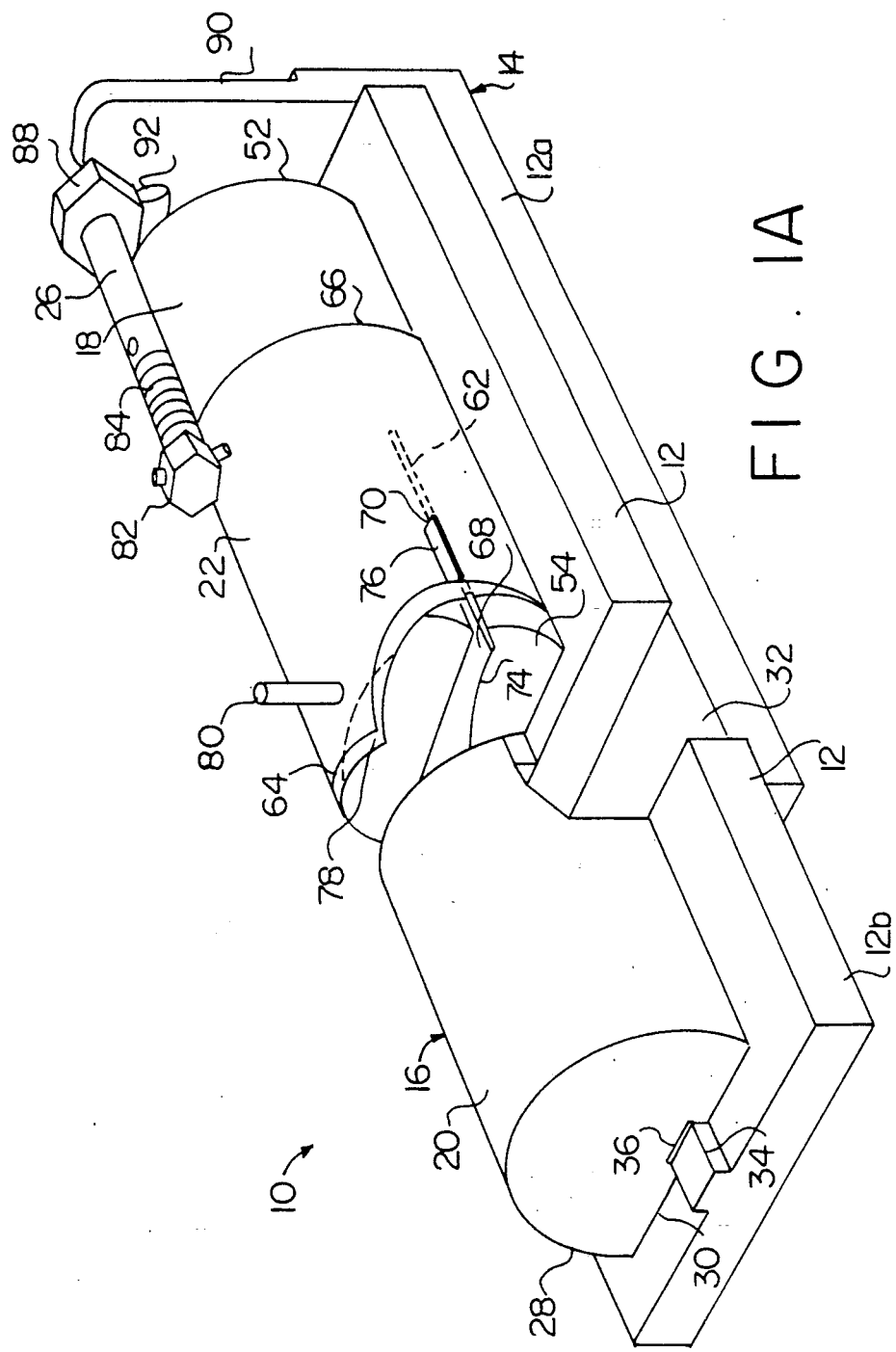

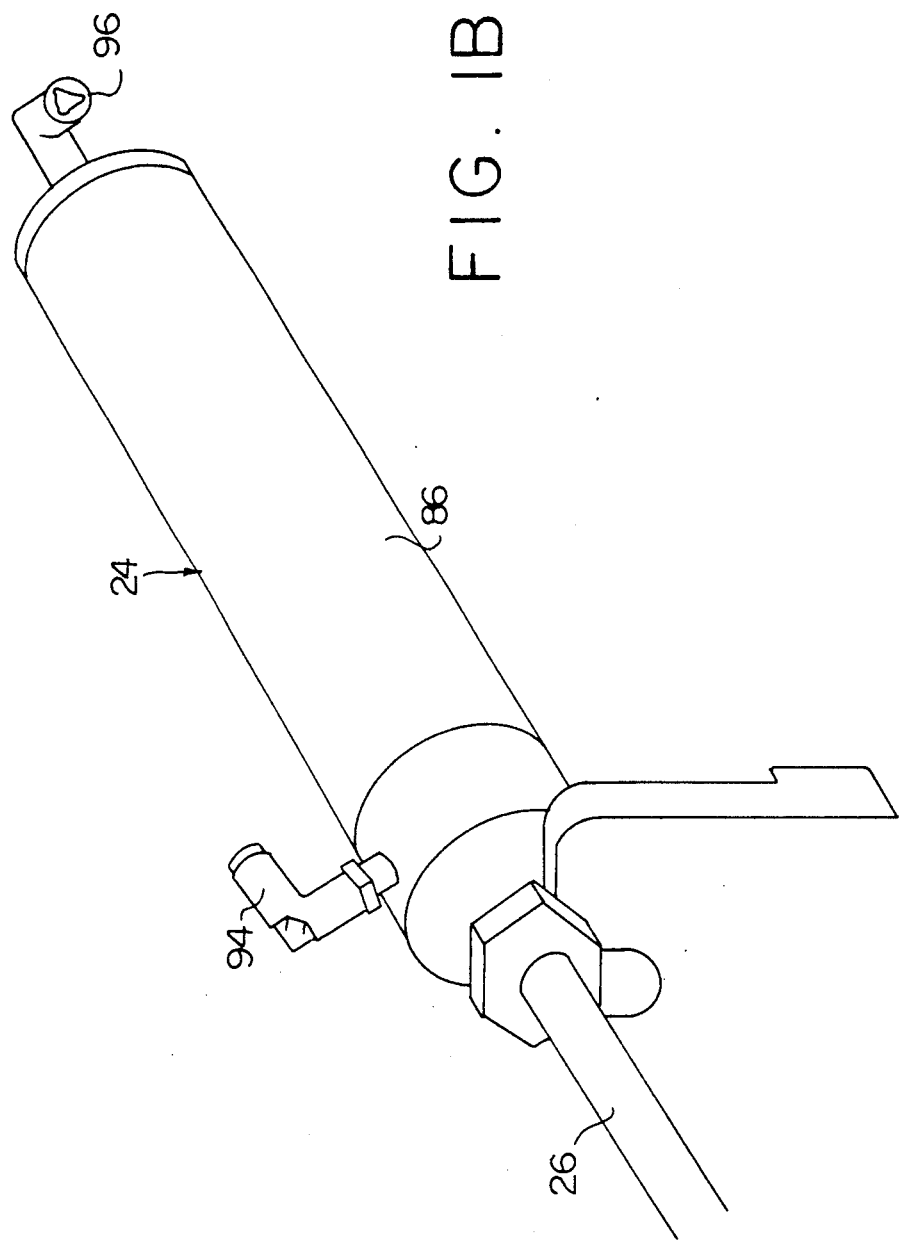
FIG. IB

CUTTING DEVICE

BACKGROUND OF THE INVENTION

This invention relates to cutting devices. The cutting device has a particularly useful application in the cutting of food and may be used to advantage with fruits which require peeling, such as an orange.

In the food industry, preparation of large quantities of food in packages is often required for use in hotels, airlines, hospitals, and other settings. Where fruit comprises a portion of the package of food, it is usually tedious to peel, cut, and remove undesirable portions of, for example, an orange, which may be required in segmented form, and the preparation of such fruit for packaging is labor intensive, requiring a great investment in time and effort.

Various traditional methods of peeling fruit such as oranges are known, such as the use of a knife or blade for removing the peel when the orange is in its whole form. However, such traditional methods of removing a peel are time consuming and inefficient, and may well result in wastage of an unacceptably high proportion of the fruit itself.

SUMMARY OF THE INVENTION

According to one aspect of the invention, there is provided a cutting device for cutting an article, the device comprising: a mounting member having a recess therein adapted to accommodate at least a part of the article; cutting means, the mounting member and cutting means being movable relative to each other so that the cutting means can extend over and be withdrawn from the recess; and means for moving the mounting member and cutting means relative to each other.

Preferably, the mounting member comprises two substantially cylindrically shaped spaced-apart portions mounted on a base, the recess being defined by the space between the two cylindrical portions, and one of the cylindrical portions is adjustable on the base so that the size of the recess can be varied. Preferably, the two cylindrical portions define a frustum-shaped recess for receiving the article.

Conveniently, the cutting means comprises a blade which is of substantially the same shape as the mounting member and moves thereover. The cutting means may comprise a first blade portion about the mounting member and a second blade portion movable within a slot in the mounting member, the first and second blade portions being adapted to cut the article on opposite sides thereof. Preferably, the mounting member is substantially cylindrical in shape and the first blade portion is substantially tubular shaped and surround the mounting block, the second blade portion being substantially flat, and the first blade portion has the cutting edge thereof shaped bi-arcuately. The means for moving may be a pneumatically operated piston mechanism, and may further comprise sensor means to determine when the article is located in the recess, the proper location of the article in the recess causing the pneumatically operated piston mechanism to be activated.

Preferably, the invention includes an article feed system for conveying the article to be cut from a source to the recess in the mounting member, the article feed system comprises a segmenting apparatus for cutting a whole article into a plurality of segments, a transport line interjacent the segmenting apparatus and the recess of the mounting member, the transport line having a first end thereof adjacent the segmenting apparatus for receiving one segment and a second end adjacent the recess in the mounting member, the transport line being constructed so as to receive and convey a segment in a specific orientation to the recess, the article feed system further comprising propulsion means for intermittently moving a segment of an article into the recess of the mounting member.

The transport line may comprise a chute of substantially triangular shape, the chute being adjacent the segmenting apparatus and arranged at an angle to the horizontal so that a segment of an article can fall therethrough by gravity, and a trough member associated with the chute, the trough being of a V-shape.

According to another aspect of the invention, there is provided a cutting device for removing a peel or outer covering from a segmented piece of fruit, the cutting device comprising: a mounting member comprising a fixed portion of substantially cylindrical shape attached to a base and an adjustable portion of substantially cylindrical shape attached to the base, the fixed and adjustable portion being co-axial and spaced apart from each other to define a recess, the fixed and adjustable portions each having a substantially planar end wall which face one another to define said recess, the upper portion of the end wall of each of the fixed and adjustable portions being cut away so that the upper portion of the recess is frustum-shaped, the fixed portion further defining a slot therein which is substantially parallel to the base portion; cutting means comprising a tubular blade being mounted on the fixed portion of the mounting block and capable of axial movement relative thereto, the flat blade being located in the slot defined by the fixed portion and fixed to the tubular blade at its edges, the tubular and flat blades being movable between a first retracted position wherein leading edges of the blades are located on one side of the recess and a second extended position whereby the leading edges of the tubular and flat blades are moved across the recess; means for moving the cutting member between the first retracted and second extended positions; wherein movement of the tubular and flat blades from the first retracted position to the second position causes a segment of fruit located in the recess to be sliced such that the outer surface is removed by the tubular blade and any undesirable inner portion removed by the first blade.

BRIEF DESCRIPTION OF THE DRAWINGS

FIG. 1A is a perspective view of a cutter in accordance with the present invention;

FIG. 1B shows a pneumatically operated piston for use with the cutter shown in FIG. 1A;

FIG. 9 is a cross-section of the chute shown in FIG. 7;

FIG. 10 is a cross-section of the trough shown in FIG. 7 of the drawings;

DESCRIPTION OF THE PREFERRED EMBODIMENTS

Figure 2:
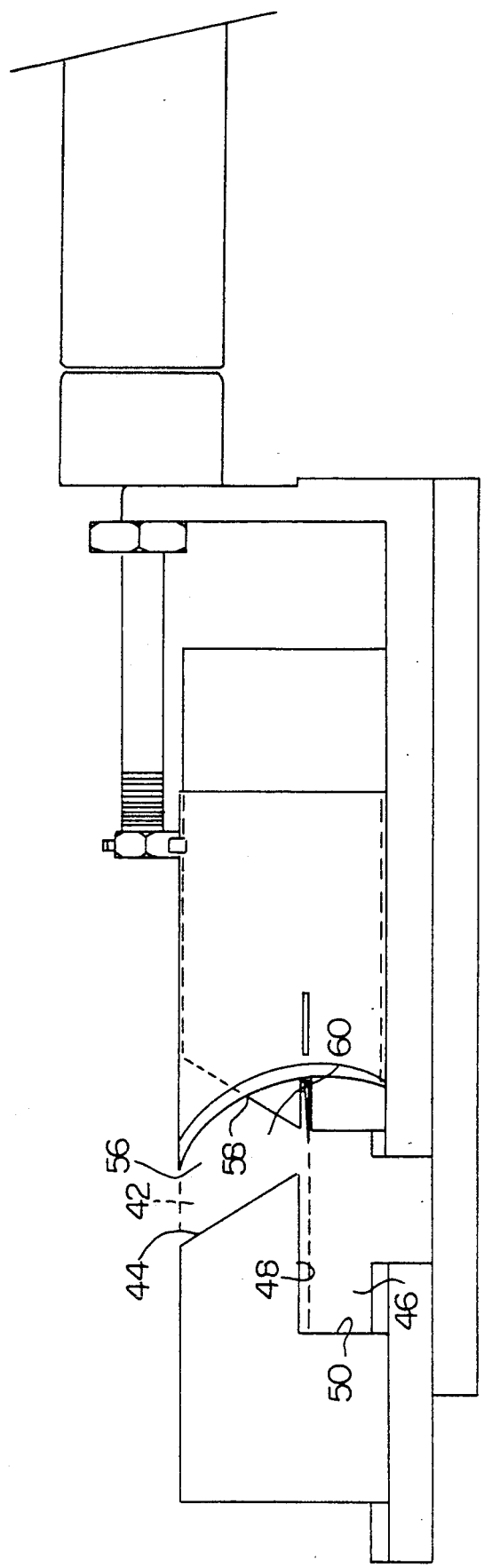
FIG. 2 is a side view of the cutter of the present invention.
Figure 3:
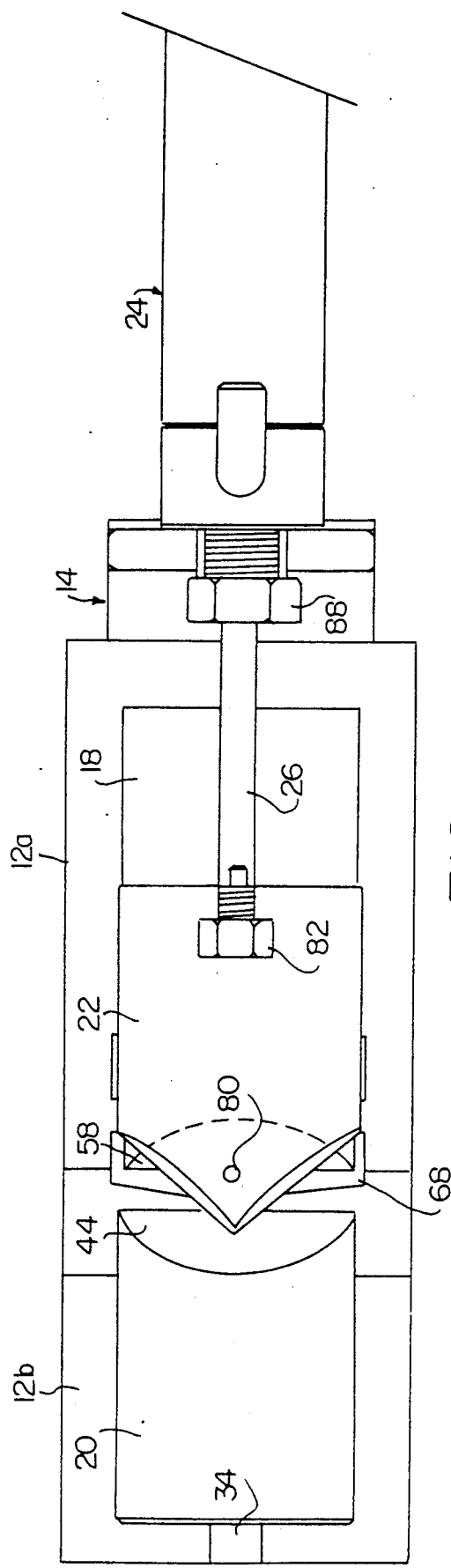
FIG. 3 is a plan view of the cutter of the invention.

Referring to the drawings, there is shown a cutter indicated generally by the reference numeral 10. The cutter 10 comprises a base member 12 located on an L-shaped support 14, and a mounting block 16 affixed to the base member. The mounting block 16 includes a fixed block 18 and an adjustable block 20. A movable blade 22 is positioned on the fixed block 18 and is slidable thereover. The movable blade 22 is connected to a pneumatically operated piston mechanism 24 via an extended piston rod 26.

The fixed block 18 and adjustable block 20 are both substantially cylindrical in shape and have substantially identical diameters. The fixed block 18 and adjustable block 20 have a cylindrical circumference portion 28 and a flat base portion 30. In each case, the blocks 18 and 20 are mounted on the base member 12 with the flat base portion 30 located directly on the base member 12. The fixed block portion 10 is mounted on base member 12a while the adjustable block portion 20 is mounted on base member 12b. The base members 12a and 12b are separated from each other by a space 32, although both base members 12a and 12b are mounted upon the L-shaped support 14.

Figure 4:
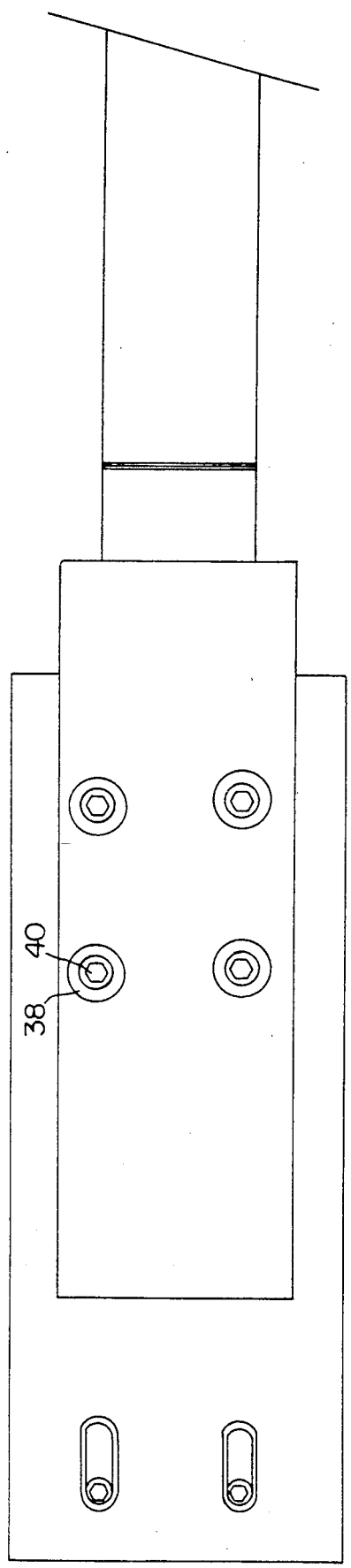
FIG. 4 is an underside view of the cutter.
Figure 5:
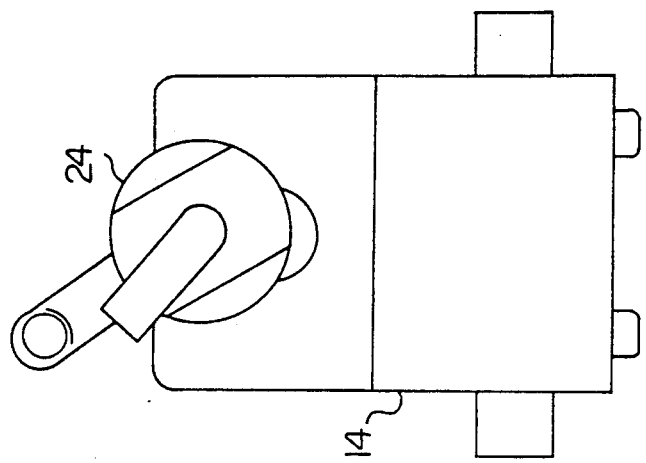
FIG. 5 is a first end view of the cutter shown in FIG. 1A.
Figure 6:
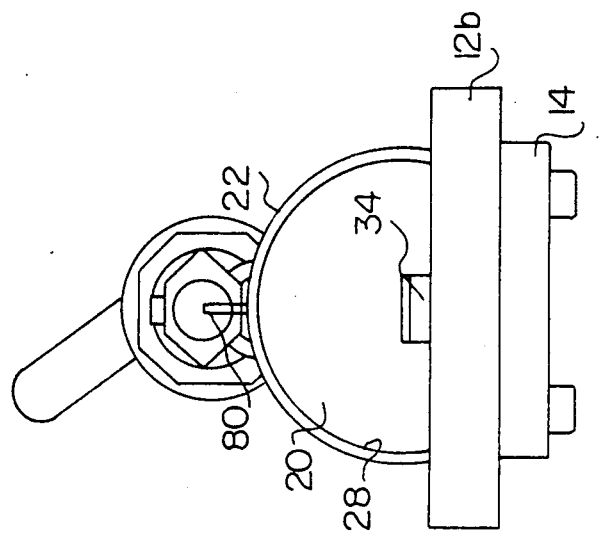
FIG. 6 is a second end view of the cutter shown in FIG. 1A.

The base member 12b has running along the center thereof a rectangular projection or track 34, with the adjustable block 20 having a corresponding groove 36. A pair of apertures 38 (best seen in FIG. 4) are formed in the base member 12b, with each aperture 38 accommodating a bolt 40 which extends upwardly through the base member 12b to the adjustable block 20. The adjustable block 20 can be moved longitudinally over the track 34 and, when in the desired position (to be discussed in further detail below), the bolts 40 are tightened in the apertures 38 to affix the adjustable block 20 relative to the base member 12b.

The adjustable block 20 has a cut-out portion 42 which defines an oblique face 44 thereon. A further cut-out portion 46 is provided on the adjustable block near the end thereof which is adjacent the fixed block 18, the cut out portion being defined by horizontal wall 48 and vertical wall 50.

The fixed block 18 has a rear end face 52 and a front end face 54. The front end face 54 incorporates a cut-away portion 56 so as to define an oblique face 58. It is to be noted that the oblique face 44 on adjustable block 20 and oblique face 58 on the fixed block 18 together define a frustum shaped recess 60 of adjustable size, depending on the position of the adjustable block 20 as mounted on the base member 12b.

The fixed block 18 has a slot 62 which is horizontal, the slot 62 being located just below the point where the oblique face 52 and front end face 54 meet. Further, the slot 62 is also located just below the level of the oblique face 44 on the adjustable block 20 and is adapted to pass below the horizontal wall 48.

The movable blade 22 is generally of cylindrical shape and follows the external contours of the cylindrical circumference portion 28 of the blocks 18 and 20.

The movable blade 22 is capable of movement over the fixed block 18 in a direction corresponding to a longitudinal axis of the fixed block 18. The blade 22 has a sharpened forward edge 64 and a blunt rear edge 66.

A flat blade 68 is also provided and is located within the slot 62. The flat blade 68 has a blunt rear edge 70 and a pointed sharpened forward edge 72. The flat blade 68 has a width which is slightly greater than the circumference of the fixed block 18, thereby having outwardly extending sides 74 which project beyond the surface of the fixed block 18. The flat blade 68 is connected to, and moves with, the movable blade 22. The movable blade 22 has an elongate aperture 76 on each side thereof. The outwardly extending sides 74 of the flat blade 68 are accommodated in the aperture 76. In this way, all movement transmitted to the blade 22 will also have the effect of moving the flat blade 68.

The sharpened forward edge 64 of the movable blade 22 is bi-arcuate, with a point 78 between the arcuate portions. The flat blade 68 is affixed to the movable blade 22 such that, in use, the sharp forward edge 72 of the flat blade 68 is slightly ahead of the point 78 on the sharpened forward edge 64 of the blade 22. It is also to be noted that the flat blade 68 is slightly below the horizontal surface 48 defining the cut-out portion 46, so that movement of the flat blade 68 towards the adjustable block 20, to be described fully below, will result in the flat blade 68 moving just below the horizontal surface 48.

A projecting pin 80 is affixed to the blade 22 in a central position, and just rearwardly of the forward edge 64 thereof.

On the blade 22, towards the rear edge 66 thereof, there is provided a linking nut 82 which is affixed to a threaded portion 84 of the extendable piston rod 26. The piston rod 26 extends into the cylindrical housing 86 of the piston mechanism 24. The piston rod 26 is provided with additional support between the linking nut 82 and the cylindrical housing 86 by a support nut 88, which support nut 88 is mounted on the vertical wall 90 of the L-shaped support 14. A recess 92 is provided in the vertical wall 90, the recess 92 permitting free axial movement of the piston rod 26, as described more fully hereunder.

The piston mechanism 24 includes the conventional air intake/outlet supply lines 94 and 96, the control of which causes movement of the piston (not shown) inside the cylindrical housing 86 in a well known conventional manner. Forward and rearward movement of the piston in the cylindrical housing 86 causes corresponding movement of the piston rod 26.

In use, the cutter 10 is adapted to receive a segment of fruit, such as an orange, from a feed mechanism as fully discussed below. The adjustable block 20 is moved on base member 12b so as to provide a recess 60 of the desired size. Thereafter, a segment of orange, for example, which has been cut but not peeled is positioned in the recess 60. While in this position, the piston mechanism 24 is actuated and the piston rod 26 rapidly moved forward. Such forward movement of the piston rod 26 results in a concomitant forward movement of the blade 22 and blade 68. Both blades 22 and 68 move across the recess 60, with the sharpened forward edge 64 of the blade 22 removing the peel from the segment. The forward edge 72 of the flat blade 68 removes the inner portion of the segment, for example the white stringlike portion of the orange. The blades 22 and 68 are then retracted over the fixed block 18 by operation of the piston mechanism 24, and the duly cut segment removed from the recess 60 to make way for a further segment to be cut.

Figure 7:
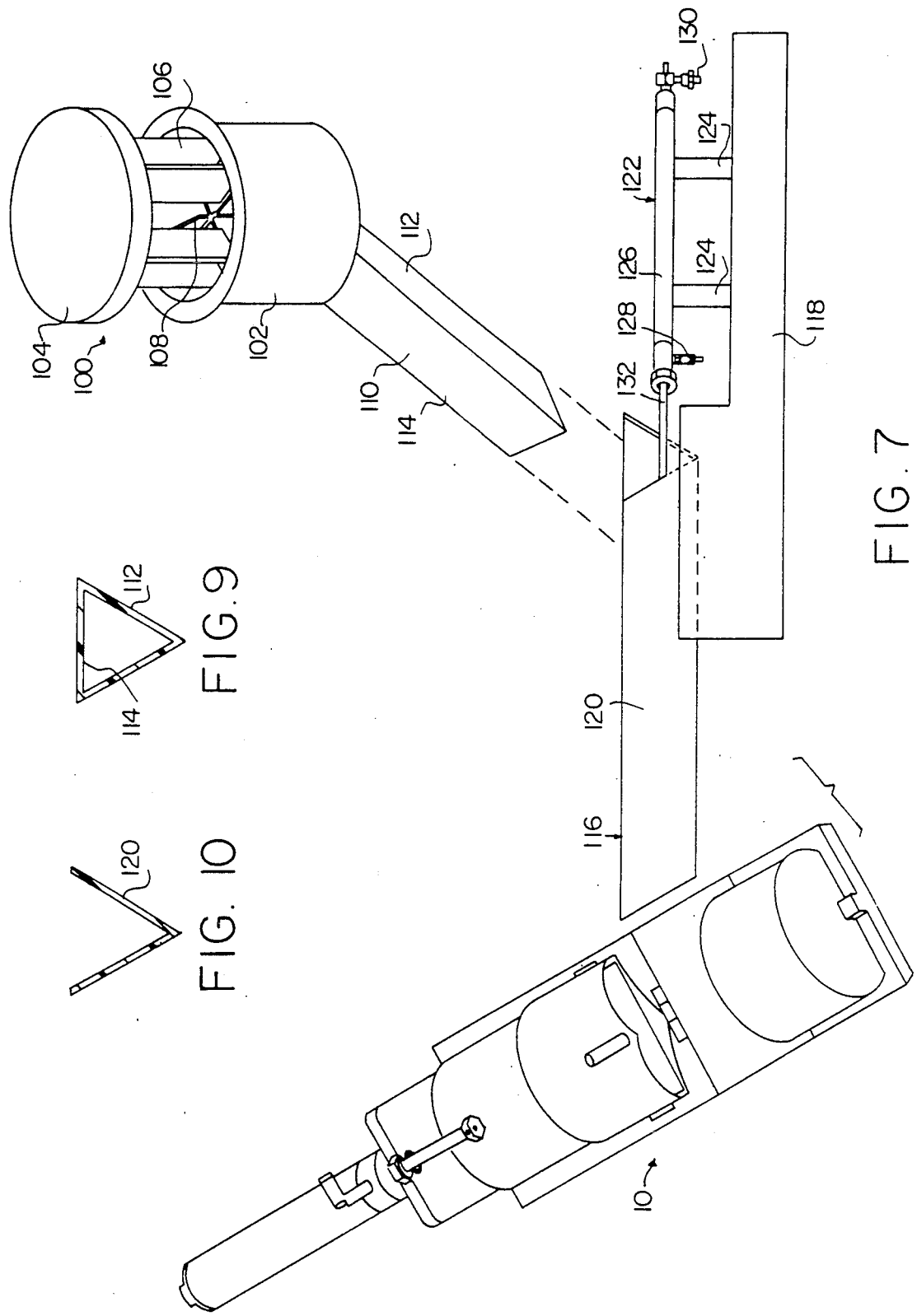
FIG. 7 is a schematic and perspective view of the fruit cutting and feed mechanism of the invention.
Figure 8:
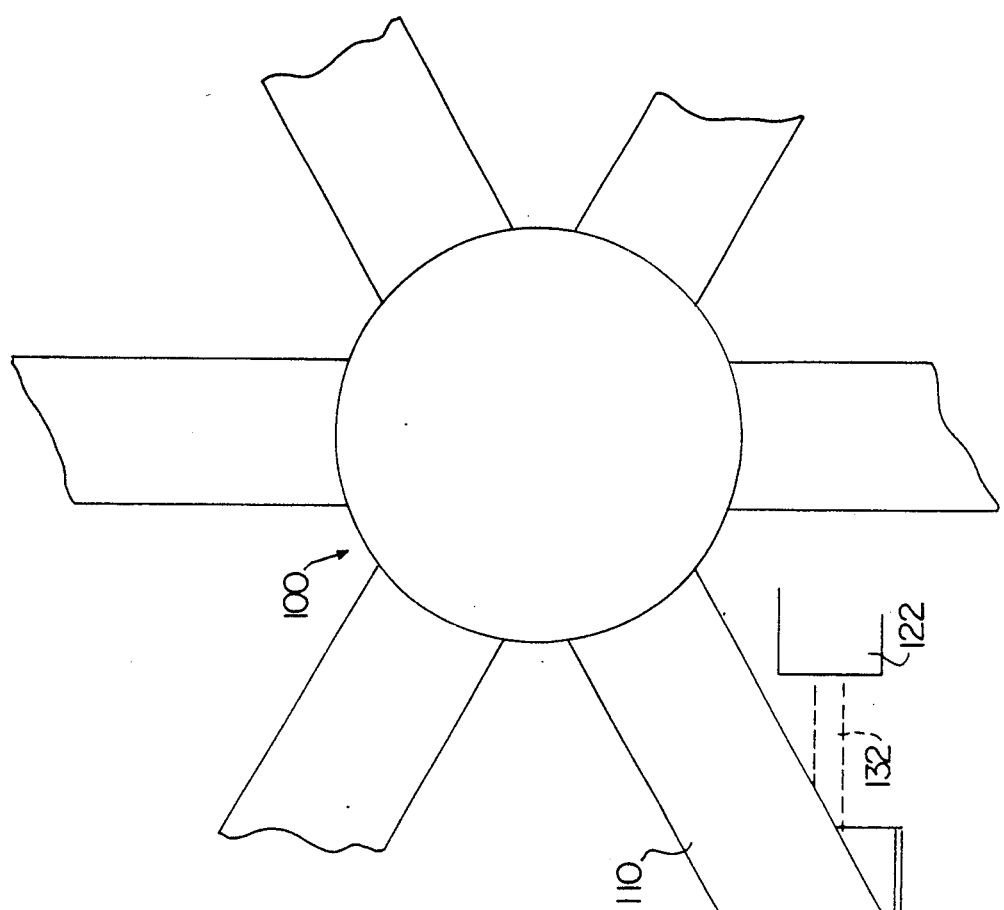
FIG. 8 is a plan view of the food cutting and feed mechanism shown in FIG. 7.

The cutter 10 of the invention includes a feed mechanism whereby a piece of fruit, for example an orange, is cut into segments and conveyed to the cutter 10 for removal of the peel and inside white material. A description of the feed mechanism will now be provided, with particular reference to FIG. 7 of the drawings. In FIG. 7, there is shown a cutter 10, substantially as described above. FIG. 7 is a schematic representation of the feed mechanism and cutter 10 showing cutting and conveying of an orange through the various stages of the feed mechanism.

The feed mechanism includes a fruit segmenter 100 having a cylindrical cutting portion 102 and a pressure piece 104. The pressure piece 104 has a series of downwardly projecting arms 106 spaced radially on the underside of the pressure piece 104. The cylindrical cutting portion 102 has three blades 108 extending diametrically, the three blades crossing at about the axis of the cylindrical cutting portion 102. The blades 108 are arranged such that six substantially equal segmented areas are defined so that when the fruit is forced through the cylindrical cutting portion 102, it will be sliced into six substantially equal sized segments. A chute 110 is located adjacent the cylindrical segmenter 100 so as to receive a segment of the fruit which has been cut. One chute is provided for each of the six segmented areas so that each cut segment of the fruit will immediately pass into a chute 110 for further processing as described hereunder. The chute 110 has a pair of sidewalls 112 and a covered portion 114 to provide a closed containment for the fruit segment.

The feed mechanism also comprises a trough 116 of substantially V-shape cross section, the trough 116 being mounted on a base 118. The trough 116 is defined by a pair of sidewalls 120, the inside surfaces of which are coated with Teflon or similar material to facilitate easy movement of the fruit segment therealong.

It is to be noted that the orientation of the fruit segment is controlled from the time the fruit is cut, until the segment reaches the cutter 10. The chute 110 is arranged so that the segment has its apex at the join of the sidewalls 112, with the open or exposed portions of the fruit adjacent to such sidewalls 112. The peel of the fruit is adjacent the covered portion 114. As the segment drops from the chute 110 into the trough 116, the orientation of the segment is maintained such that the peel is at the top and the inner or exposed portion of the fruit towards the apex of the trough 116. In this way, the fruit is correctly oriented for introduction to the cutter 10 as described below. A piston mechanism 122 is provided adjacent the trough 116 and mounted on the base 118 by suitable support posts 124. The piston mechanism 122 comprises a cylindrical housing 126, air intake/outlet ports 128 and 130 and a piston rod 132. Appropriate control of the air intake/outlet ports 128 and 130, as is well known, results in axial forward and rearward movement of the piston rod 132 in the trough 116.

Mechanical or optical sensors may be provided as discussed more fully hereunder, which activate the piston mechanism 122. At the appropriate moment when a segment of fruit is located in the trough 116, introduction of air into port 130 results in forward axial movement of the piston rod 132, the end of which pushes the fruit segment forward along the trough 116 into the conical recess 60 of the cutter 10.

The operation of the cutter and feeding mechanism of the invention will now be described. In this example, further explanation will be with reference to an orange, although it must be appreciated that the invention should not in any way be seen as limited to segmenting and peeling of an orange.

At the outset, an orange is placed in the cylindrical cutting portion 102 with the axis of the orange vertically oriented. Thereafter, the pressure piece 104 is placed over the orange and thereby forced through the cutting portion 102 through the blades 108. The orange will thereby be sliced into six substantially equal sized segments. A chute 110 is provided to receive each segment. A segment thus falls from the cylindrical cutting portion 102 into the chute 110 with the axis of the segment near the meeting point of the sidewalls 112, with the peel thereof facing the covered portion 114. The segment falls through the chute by gravity, although an airstream or other source of pressure may be provided in the chute 110 to force the segment therethrough. The segment thus falls from the chute 110 into the trough 116, with the orientation of the segment being maintained with the peel facing upwards and the inner portion towards the apex of the trough 116. A sensor, to be discussed more fully below, senses the presence of the segment and activates the piston mechanism 122 such that the piston rod 132 becomes extended and moves the segment along the trough 116 towards the cutter 10. The trough 116 is located adjacent the cutter 10 such that movement of the segment out of the trough 116 places it within the conical recess 60 of the cutter. When the segment is in the conical recess 60, sensing means activate the piston mechanism 24 and the blades 22 and 68 move rapidly forward. The size of the recess 60 is adjusted such that the white string part of the orange is located below the level of the blade 68, while the peel thereof is located above the level of the surface of the blocks 18 and 20. Thus, the forward movement of the blade 22 will remove the peel from the fruit, while the blade 68 will remove the undesirable white inner part of the fruit which. The projecting pin 80 comes into contact with the removed peel, and on account of the fact that it is moving forward rapidly, projects the removed peel away from the cutter 10 into a receptacle (not shown). The blades 22 and 68 are thereafter withdrawn to the original position by the action of the piston mechanism 24. A fresh segment of fruit to be peeled and cut is thereafter moved along the trough 116 into the recess 60 and the cut segment ejected therefrom by the incoming segment into a receptacle for further processing.

It will be appreciated that, by appropriately coordinating the various components of the feed mechanism and cutter, a large number of oranges can be segmented and peeled very accurately and rapidly.

As described here above, the size of the recess 60 can be adjusted by appropriate axial movement of the adjustable block 20, so that segments of differing sizes can be processed by the present apparatus.

It is also to be noted that only the conveyance of one segment of the sliced fruit is described from the cylindrical cutting portion 102 to the cutter 10. However, it must be appreciated that this conveyance of the segment takes place away from the cylindrical cutting portion 102 in six directions, one for each of the segments produced by the action of the blades 108 in the cutting portion 102.

Figure 11:
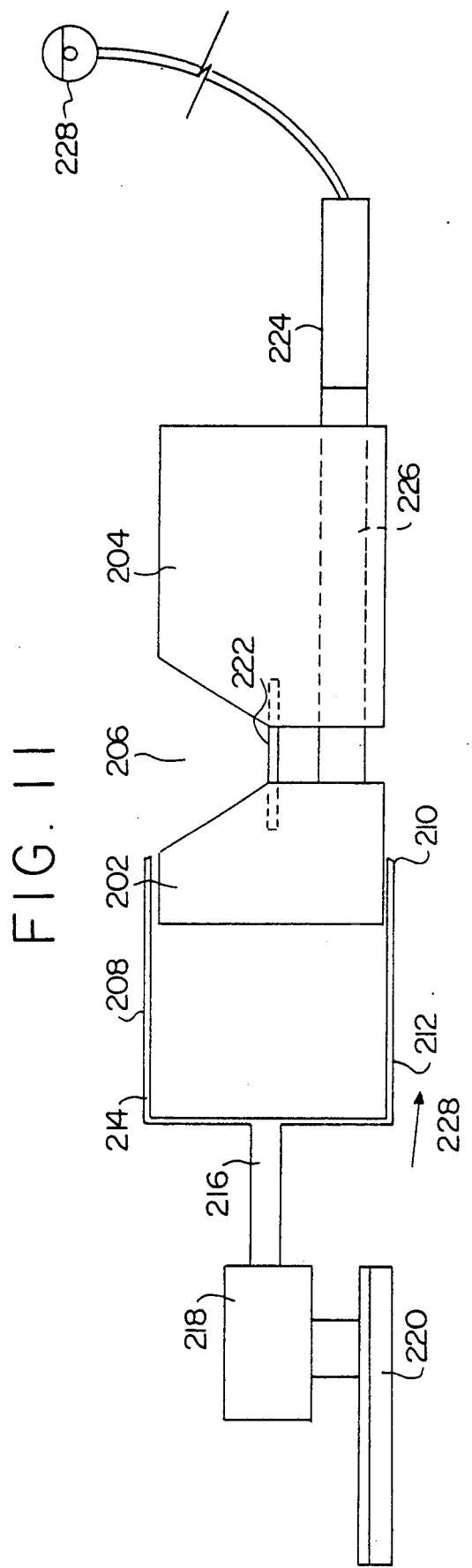
FIG. 11 is a schematic side view of a cutting device showing a second embodiment of the invention.

A second embodiment of a cutting device of the invention will not be described, with reference to FIG. 11 of the drawings. In FIG. 11, a cutter 200 comprises a movable block 202 and a fixed block 204. A conical recess 206 is provided between blocks 202 and 204 in much the same way as is described with reference to the first embodiment above. Therefore, a repetition of every feature will not be undertaken at this point, and the earlier description of the adjustable and fixed blocks is incorporated at this point.

A hollow cylindrical blade 208 is provided about the movable block 202. The blade 208 has a sharpened leading edge 210 at the forward end 212 of the blade. At the rear end 214 of the blade 208, there is provided a shaft 216, the shaft 216 being rotated by a motor 218. The shaft 216 causes the blade 208 to rotate about its axis. The motor 218 is mounted on a support base 220.

A further blade 222 is provided near the base of the conical recess 206.

An adjusting mechanism 224 is provided which is adapted to vary the distance between the movable and fixed blocks 202 and 204, thereby varying the size of the conical recess 206. The adjusting mechanism 224 attaches to an adjusting pin 226 which fixes to the movable block 202. A sensor 228 (shown schematicaly) is located in the feed mechanism at or near the cutter 200, and is adapted to sense the size of segment which is about to be introduced into conical recess 206. Having sensed the dimensions of the segment, the adjusting mechanism 224 causes axial forward or rearward movement of adjusting pin 226 so that the movable block 202 is brought toward, or moved away from, the fixed block 204. In this way, the conical recess 206 is varied on a continuing basis according to the size of the segment which it will accommodate.

In operation, a fruit segment is introduced to the conical recess 206, and the introduction of such segment to the recess 206 may take place in substantially similar manner to that already described above. The various constructional features of the feed mechanism will therefore not be repeated at this point. A segment of fruit is introduced into the conical recess 206, and the blade 222 is positioned such that the inner white portion of the orange segment is removed. The blade 222 is located such that the segment must move through the blade in order to enter the conical recess 206, and this action results in the severance of the inner white material from the fruit. Once the segment is placed inside the conical recess 206, the blade 208 is moved in a direction as indicated by arrow 228 towards the fixed block 204. This movement is accomplished by the action of the shaft 216 and the motor 218. As the spinning blade 208 moves over the conical recess, the peel of the orange will be removed. The action of the spinning blade 208 on the peel will force the peel to be discarded away from the cutter 200. The blade 208 is thereafter retracted, the peeled segment removed and a new segment introduced for peeling.

Figure 12:
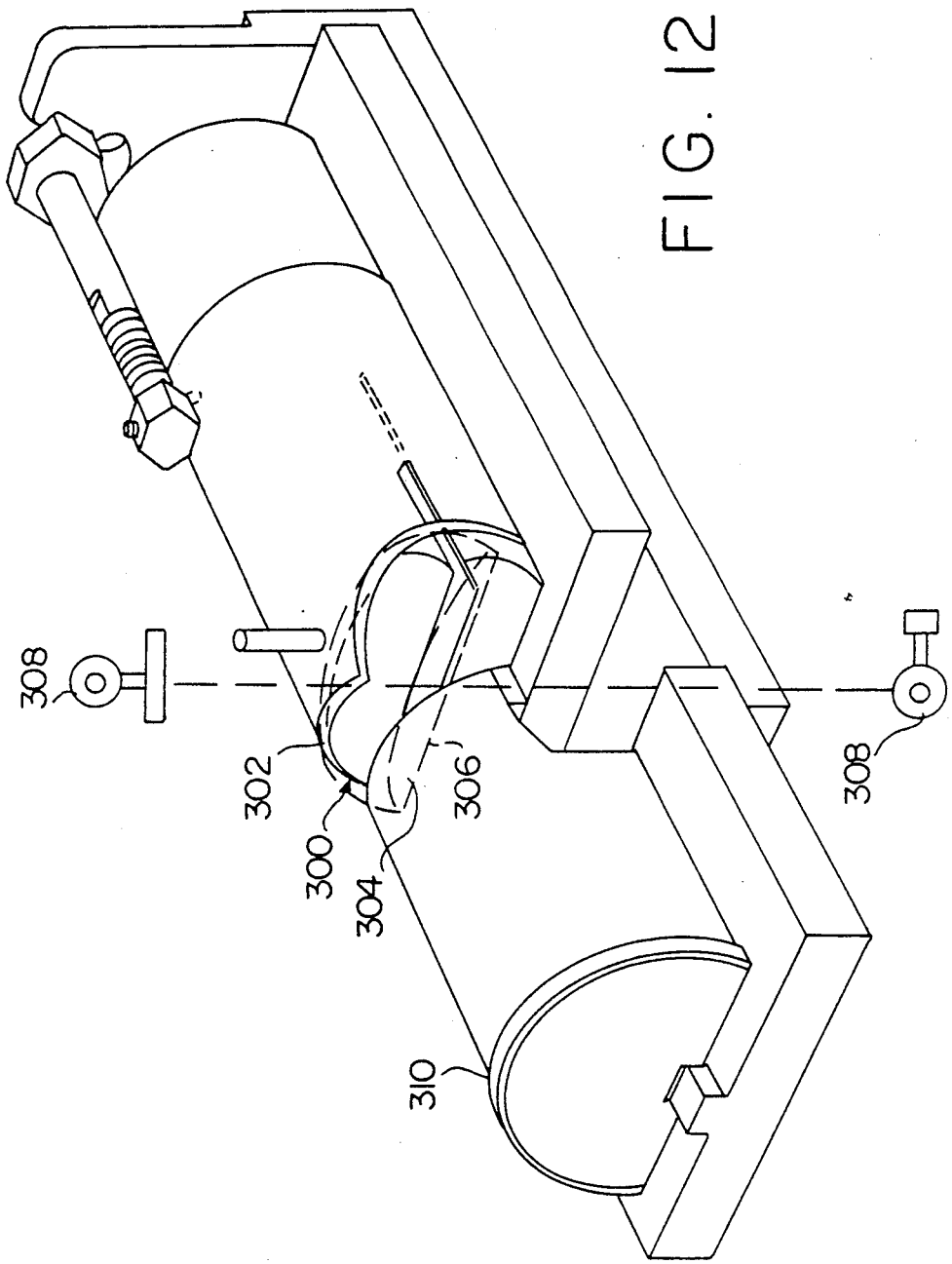
FIG. 12 is a perspective view of the cutting device shown in FIG. 1 and incorporating various additional features.

Reference is now made to FIG. 12 of the drawing. In this figure there is shown a cutter 10 which is substantially identical to that already described and illustrated in FIG. 1A of the drawing.

In FIG. 12, there is shown in diagramatic outline a segment of an orange 300 having an outer peel 302, an inner fruit section 304, and a core 306. The orange 300 is located in the recess 60 of the cutter 10.

An optical eye 308 is provided to sense how far above the level of the blocks 18 and 20 the segment extends. Where a large segment 300 is located in the recess 60, the peel portion 302 will be higher and will interrupt the beam of the optical eye 308. Interruption of the beam triggers a motor which will move adjustable block 20 away from fixed block 18 thereby increasing the size of recess 60. An increase in the size of the recess will permit the segment 300 to drop slightly, until such time as the electronic beam is no longer interrupted. At this point, the segment 300 will be properly located in the recess 60 and the cutting action can commence as fully described above. In this way, the recess 60 can be custom set according to the size of each segment fed to the recess 60.

Instead of an optical eye 308, there may be provided a mechanical pressure-sensitive sensor above the recess which will be activated by the segment, and the size of the recess can be set accordingly.

A further optical sensor 310 is provided to determine whether the segment 300 is properly and centrally located in the recess 60. The sensor 310 determines whether the peel 302 of the segment 300 is properly located in the recess, and the cutting mechanism will be delayed until such time as the segment 300 is properly positioned.

It is also to be noted that there are other sensors, and means for coordinating the moving structures of the assembly may be provided to insure smooth and uninterrupted operation. Such sensors and means for coordinating the various actions of the assembly are well-known and will not be described herein.

The invention is not limited to the precise constructional details hereinbefore described or illustrated. It will be appreciated that any suitable structure for holding the fruit segment in the desired location is sufficient for this invention. Further, any suitable blade mechanism which moves relative to the mounting means and which will have the effect of removing the outer portion or peel of a segment to be cut will suffice. Moreover, in the embodiments shown, it is not necessary that the blade or any other parts to be moved are so moved by a pneumatically operated piston. Any suitable mover may be employed, such as a motor, hydraulically operated piston, or even a manually operated lever may be provided so that the blade is advanced by an operator. Such a manual lever may be provided in addition to, or instead of, any automatic device for moving the blade or block.

It must also be noted that the system may employ additional sensor means for tracking the progress of any segment through the system, and such sensor means may also be provided for correcting orientation or position of a segment, if this should become necessary. A full system of sensors may also be provided to determine the position of the segment within the recess 54 of the cutter to insure accurate and precise operation of the feeding mechanism and to optimize the number of segment treated in the system. Means for coordinating signals received from these sensors and programming the feed mechanism accordingly may also be provided.

I claim:

1. A device for cutting an article, the device comprising:

a mounting member having a recess therein adapted to accommodate at least a segment of the article, the mounting member comprising two substantially cylindrical shaped spaced-apart portions mounted on a base, the recess being defined by the space between the two cylindrical portions;

cutting means, the cutting means being movable relative to the mounting member between an extended position wherein the cutting means is over the recess and a withdrawn position wherein the cutting means is away from the recess; and means for moving the mounting members and cutting member relative to each other.

2. A cutting device as claimed in claim 1 wherein one of the cylindrical portions is adjustable on the base so that the size of the recess can be varied.

3. A cutting device as claimed in claim 1 wherein the two cylindrical portions define a frustom-shaped recess for receiving the article.

4. A cutting device as claimed in claim 1 wherein the cutting means comprises a blade which is of substantially the same shape as the mounting member and moves thereover.

5. A cutting device as claimed in claim 1 wherein the cutting means comprises a first blade portion about the mounting member and a second blade portion movable within a slot in the mounting member, the first and second blade portions being adapted to cut the article on opposite sides thereof.

6. A cutting device as claimed in claim 5 wherein the mounting member is substantially cylindrical in shape and the first blade portion is of tubular shaped and surrounds the mounting member, the second blade portion being substantially flat.

7. A cutting device as claimed in claim 6 wherein the first blade portion has the cutting edge thereof shaped bi-arcuately.

8. A cutting device as claimed in claim 1 wherein the means for moving comprises a pneumatically operated piston mechanism.

9. A cutting device as claimed in claim 8 further comprising sensor means to determine when the article is located in the recess, the proper location of the article in the recess causing the pneumatically operated piston mechanism to be activated.

10. A cutting device as claimed in claim 9 wherein the sensor is an optical sensor.

11. A cutting device as claimed in claim 9 wherein the sensor is a mechanical pressure sensitive sensor.

12. A cutting device as claimed in claim 1 wherein the two cylindrical portions have adjacent faces spaced apart from each other, each adjacent face having an upper portion which is cut-away, the two cut-away portions defining a frustum-shaped recess.

13. A cutting device as claimed in claim 1 further comprising an ejection member for ejecting any portion of the article severed by the blade.

14. A cutting device as claimed in claim 1 further comprising an article feed system for conveying the article to be cut from a source to the recess in the mounting member.

15. A cutting device as claimed in claim 14 wherein the article feed system comprises a segmenting apparatus for cutting a whole article into a plurality of segments, a transport line interjacent the segmenting apparatus and the recess of the mounting member, the transport line having a first end thereof adjacent the segmenting apparatus for receiving one segment and a second end adjacent the recess in the mounting member, the transport line being constructed so as to receive and convey a segment in a specific orientation to the recess, the article feed system further comprising propulsion means for intermittently moving a segment of an article into the recess of the mounting member.

16. A cutting device as claimed in claim 15 wherein the propulsion means comprises a pneumatically operated piston mechanism, with a piston rod projecting into the transport line to push a segment of an article into the recess of the mounting member.

17. A cutting device as claimed in claim 16 further comprising sensing means in association with the propulsion means, the propulsion means being actuated in response to a signal from the sensing means.

18. A cutting device as claimed in claim 15 wherein the transport line comprises a chute of substantially triangular shape, the chute being adjacent the segmenting apparatus and arranged at an angle to the horizontal so that a segment of an article can fall therethrough by gravity, and a trough member associated with the chute, the trough being of a V-shape.

19. A cutting device as claimed in claim 15 wherein the transport line has its surfaces coated with a Teflon material.

20. A cutting device as claimed in claim 1 wherein the mounting member is of cylindrical shape, the cutting means comprises a hollow tubular saw driven by a motor to rotate, the saw being adapted to be moved over and withdrawn from the recess defined by the mounting block.

21. A cutting device as claimed in claim 20 further comprising an additional blade located adjacent the mounting member at the lower region of the recess, the additional blade being adapted to slice off a portion of the article as it enters the recess.

22. A cutting device as claimed in claim 2 further comprising sensing means for determining the dimensions of the article, and means for adjusting the distance between the two cylindrical portions in response to a signal from the sensing means so as to vary the size of the recess in accordance with the article to be accommodated thereby.

23. A cutting device as claimed in claim 20 further comprising a motor for rotating the tubular saw and advancing and retracting it longitudinally.

24. A cutting device for removing a peel or outer covering from a segmented piece of fruit, the cutting device comprising:

a mounting member comprising a fixed portion of substantially cylindrical shape attached to a base and an adjustable portion of substantially cylindrical shape attached to the base, the fixed and adjustable portion being co-axial and spaced apart from each other to define a recess, the fixed and adjustable portions each having a substantially planar end wall which face one another to define said recess, the upper portion of the end wall of each of the fixed and adjustable portions being cut away so that the upper portion of the recess is frustum-shaped, the fixed portion further defining a slot therein which is substantially parallel to the base portion;

cutting means comprising a tubular blade and a flat horizontal blade, the tubular blade being mounted on the fixed portion of the mounting member and capable of axial movement relative thereto, the flat blade being located in the slot defined by the fixed portion and fixed to the tubular blade at its edges, the tubular and flat blades being movable between a first retracted position wherein leading edges of the blades are located on one side of the recess and a second extended position whereby the leading edges of the tubular and flat blades are moved across the recess;

means for moving the cutting member between the first retracted and second extended positions;

wherein movement of the tubular and flat blades from the first retracted position to the second extended position causes a segment of fruit located in the recess to be sliced such that the outer surface is removed by the tubular blade and any undesirable inner portion removed by the flat blade.

25. A cutting device as claimed in claim 24 wherein the base includes a track and the adjustable portion of the mounting block includes a corresponding groove whereby the adjustable portion can be axially repositioned to vary the size of the recess defined by the fixed and adjustable portions.

26. A cutting device as claimed in claim 24 further comprising a feed mechanism, the feed mechanism comprising a segmenting apparatus for slicing the fruit into segments, a transport line for transporting a segment in a specific orientation towards the recess of the mounting block, and projecting means for projecting a segment of fruit from the transport line into the recess.

27. A cutting device as claimed in claim 26 further comprising sensing means for sensing the position of a segment, the sensing means activating the means for moving to advance fruit segments into the recess.

* * * * *